US008281287B2

(12) United States Patent
Finocchio

(10) Patent No.: US 8,281,287 B2
(45) Date of Patent: Oct. 2, 2012

(54) COMPACT, PORTABLE, AND EFFICIENT REPRESENTATION OF A USER INTERFACE CONTROL TREE

(76) Inventor: Mark J. Finocchio, Redmond, WA (US)

( * ) Notice: Subject to any disclaimer, the term of this patent is extended or adjusted under 35 U.S.C. 154(b) by 1226 days.

(21) Appl. No.: 12/037,097

(22) Filed: Feb. 26, 2008

(65) Prior Publication Data

US 2009/0125820 A1    May 14, 2009

Related U.S. Application Data

(60) Provisional application No. 60/987,392, filed on Nov. 12, 2007.

(51) Int. Cl.
*G06F 9/45* (2006.01)
(52) U.S. Cl. .......................... 717/140; 715/760; 717/106
(58) Field of Classification Search ................... 717/106, 717/136, 137, 144; 715/237, 200
See application file for complete search history.

(56) References Cited

U.S. PATENT DOCUMENTS

| | | | |
|---|---|---|---|
| 5,347,629 A | 9/1994 | Barrett et al. | |
| 6,766,353 B1 | 7/2004 | Lin et al. | |
| 6,966,054 B2 * | 11/2005 | Simonyi ........................ | 717/144 |
| 7,234,113 B1 | 6/2007 | Matz et al. | |
| 7,281,248 B2 | 10/2007 | Demsey et al. | |
| 7,334,216 B2 * | 2/2008 | Molina-Moreno et al. ... | 717/109 |
| 7,461,369 B2 * | 12/2008 | Zhao et al. ..................... | 717/131 |
| 7,467,375 B2 * | 12/2008 | Tondreau et al. .............. | 717/137 |
| 7,610,575 B2 * | 10/2009 | Sproule ......................... | 717/103 |
| 7,614,052 B2 * | 11/2009 | Wei ............................... | 717/176 |
| 7,752,256 B2 * | 7/2010 | Bloch et al. ................... | 709/203 |
| 7,765,165 B2 * | 7/2010 | Malden et al. ................. | 705/304 |
| 7,886,269 B2 * | 2/2011 | Williams et al. .............. | 717/121 |
| 7,912,935 B2 * | 3/2011 | Merissert-Coffinieres et al. .............................. | 709/223 |
| 2003/0043192 A1 | 3/2003 | Bouleau | |
| 2004/0261032 A1 | 12/2004 | Olander et al. | |
| 2005/0108034 A1 | 5/2005 | Musson et al. | |

(Continued)

FOREIGN PATENT DOCUMENTS

GB    2385952 A    10/2001

OTHER PUBLICATIONS

"Websphere Strategies for Iseries Professionals", http://search400.techtarget.com/tip/1,289483,sid3_gci968235,00.html.

(Continued)

*Primary Examiner* — Isaac Tecklu
*Assistant Examiner* — Mohammad Kabir
(74) *Attorney, Agent, or Firm* — Mayer & Williams P.C.

(57) ABSTRACT

A non-tree representation of a UI control tree is provided by a compact UI binary file that is generated by encoding a UI definition markup file expressing UI controls and behavior in human-readable form. The UI binary file is utilized in a runtime environment on a computing device as a source of a binary instruction stream. The stream can be efficiently processed by an interpreter on the device without needing validation between loading and rendering the UI. The encoding places much of the representation into an object and script section of the UI binary file. The interpreter runs this section without it being entirely resident in the device's memory to minimize the memory footprint. At runtime, operation code ("op-code") streams contained in this section are used to build UI objects, and implement scriptable behavior for manipulating the UI objects to render the UI on the device with the designed behavior.

19 Claims, 4 Drawing Sheets

U.S. PATENT DOCUMENTS

| | | |
|---|---|---|
| 2006/0041840 A1* | 2/2006 | Blair et al. .................... 715/513 |
| 2006/0075070 A1* | 4/2006 | Merissert-Coffinieres et al. ............................. 709/218 |
| 2006/0136867 A1 | 6/2006 | Schneider et al. |
| 2007/0130205 A1 | 6/2007 | Dengler et al. |
| 2007/0130572 A1* | 6/2007 | Gilbert et al. ................. 719/318 |
| 2010/0005447 A1* | 1/2010 | McCoy ......................... 717/115 |
| 2010/0058220 A1* | 3/2010 | Carpenter .................... 715/772 |
| 2011/0078600 A1* | 3/2011 | Guertler et al. .............. 715/765 |

OTHER PUBLICATIONS

"Control Hierarchy Processing", http://aspalliance.com/68_Control_Hierarchy_Processing.

"Use the .NET Framework to Generate and Execute Custom Controls at Run Time", http://msdn.microsoft.com/msdnmag/issues/05/12/CodeGeneration/.

"Porting approach", http://developer.sonyericsson.com/wiki/display/leftnav/Porting+approach.

* cited by examiner

COMPACT, PORTABLE, AND EFFICIENT REPRESENTATION OF A USER INTERFACE CONTROL TREE

STATEMENT OF RELATED APPLICATION

This application claims the benefit of U.S. Provisional Patent Application Ser. No. 60/987,392, filed Nov. 12, 2007, entitled "Compact, Portable, and Efficient Representation of a User Interface Control Tree" the disclosure of which is incorporated by reference.

BACKGROUND

All software applications that interact with humans in some way need to have a user interface ("UI"). A UI is a collection of UI controls laid out on a window/surface in such a manner as to provide the user access to the application's functionality. Menu bars, toolbars, wizards, dialog boxes, tabs, panels, text fields, radio buttons, checkboxes, and the all-familiar buttons are examples of UI controls.

When a developer implements a particular UI, a UI framework is selected which helps with the drawing, layout, and input routing for the UI about to be built. As the developer builds the UI, the controls are typically grouped in panels, tabs, dialog boxes, child windows, all the way up to the main window, effectively creating a hierarchy of UI controls.

Traditionally, the code written by the developer to describe the entire hierarchy of UI controls ends up describing the nodes of a tree commonly referred to as a UI control tree. There are two existing problems that a UI framework faces with this approach: the code used to express the UI control tree tends to be bulky because it works much like a document object model; and it can take up a lot of space in memory and in persistent storage (e.g., on disk). In addition, when it comes time for the UI to be rendered on screen, it is costly to validate and interpret this code/tree every time the UI needs to loaded and painted on screen.

This Background is provided to introduce a brief context for the Summary and Detailed Description that follow. This Background is not intended to be an aid in determining the scope of the claimed subject matter nor to be viewed as limiting the claimed subject matter to implementations that solve any or all of the disadvantages or problems presented above.

SUMMARY

A non-tree representation of a UI control tree is provided by a compact UI binary file that is generated by encoding a UI definition markup file expressing UI controls and behavior in human-readable form. The UI binary file is utilized in a runtime environment on a computing device as a source of a binary instruction stream. The binary instruction stream can be efficiently processed by an interpreter on the device without needing validation between loading and rendering the UI. The encoding places much of the representation into an object and script section of the UI binary file. This section is run by the interpreter without being entirely resident in the device's memory to minimize the memory footprint. At runtime, operation code ("op-code") streams contained in the object and script section are used to build UI objects, and implement scriptable behavior for manipulating the UI objects to render the UI on the device with the designed behavior.

The UI binary code is advantageously portable across platforms without modification. Accordingly, a developer may create a single UI that may execute on different platforms including, for example desktop PCs (personal computers) and portable devices such as media players and mobile phones.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
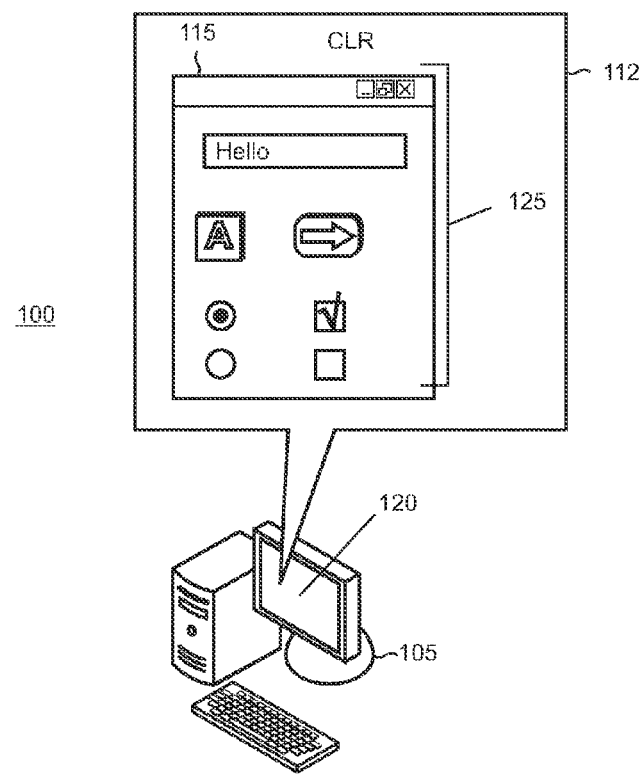
FIGS. 1 and 2 show illustrative computing environments in which the present compact, portable, and efficient UI control tree representation may be implemented.
Figure 2:
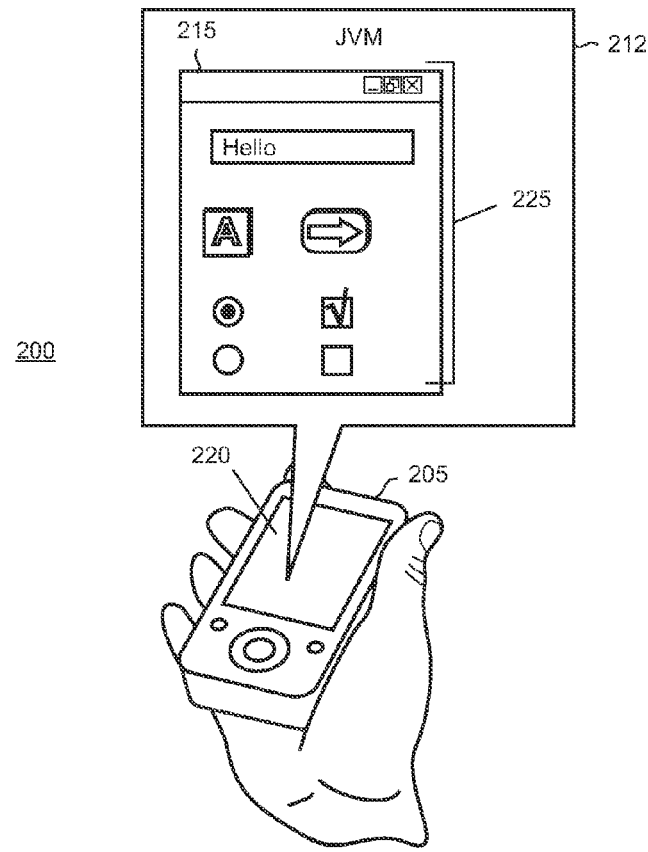

FIGS. 1 and 2 show illustrative computing environments, respectively indicated by reference numerals 100 and 200 in which the present compact, portable, and efficient UI control tree representation may be implemented. In environment 100, a desktop PC 105 is representative of a class of devices characterized by relatively high levels of computational power, memory, and storage. By comparison, in environment 200, a portable electronic device 205, such as a media player, smart phone, mobile phone, PDA (personal digital assistant), handheld game player, or the like, has relatively lower levels of capabilities. However, in its binary form, the present UI control tree representation is arranged to be portable across differing platforms and operating system architectures.

In environment 100, the desktop PC uses CLR 112 (Common Language Runtime) as its core runtime engine under the Microsoft Windows® operating system or .NET Framework. By comparison in environment 200, the portable device 205 uses the Microsoft Windows CE operating system, for example, on which a Java Virtual Machine 212 ("JVM") provides a Java-enabled runtime environment. In this illustrative example, the UI binary code that provides the UI control representation is portable across platforms. In this way, the UI binary code provides cross-platform functionality in a similar manner by Microsoft IL (Intermediate Language) or Java byte code as long as the device includes a CLR or JVM, respectively. However, it is emphasized that the CLR and JVM environments are illustrative, and other runtime environments supporting various computational and data models may also be used as required in a specific implementation.

Environment 100 supports a UI 115 that is rendered onto the desktop PC's display monitor 120. UI 115 includes a variety of conventional UI controls including menus, toolbars, buttons, icons, radio buttons, text boxes, check boxes and the like as collectively identified by reference numeral 125 in FIG. 1. In a similar manner, environment 200 supports a UI 215 that is rendered onto the portable device's built in screen 220. UI 215 also includes a variety of conventional UI controls 225.

Figure 3:
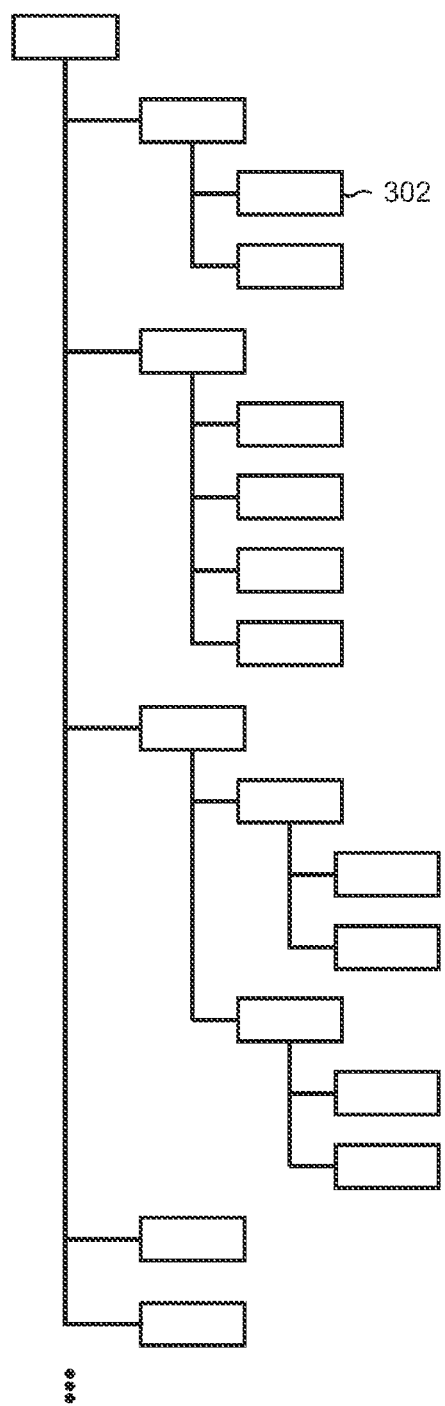
FIG. 3 shows an illustrative UI control tree in a high level form.

Conventionally, the UI controls shown in FIGS. 1 and 2 are represented during the UI development process and at runtime using a UI control tree. An illustrative conventional UI control tree 300 is shown in FIG. 3. Here, each node in the tree (an illustrative node being identified by reference number 302) typically represents a UI object that models behaviors, operations, or properties/attributes associated with a control, where the UI objects are arranged in a hierarchical manner, as shown, as required to implement a desired user experience. Depending on the complexity and feature set provided by the UI, the UI control tree can be large and consume significant disk or storage space on the device (e.g., desktop PC 105 or portable device 205). At runtime, the entire UI control tree 300 would traditionally be represented in memory, where the nodes in the tree are traversed (i.e., "walked") as required to render the UI. And, as the code in the UI control tree is validated between loading and rendering on the device, there can be significant resource costs associated when using these traditional UI control representations. Such costs can be particularly problematic with portable devices and other thin clients where resources and capabilities in the environment are typically limited.

By contrast, with the present arrangement, a non-human-readable binary representation of the UI control tree will typically provide a 10:1 reduction in the size of the UI code in its persisted form. By being so compact, its interpretation during runtime can be made significantly more efficient. In addition, this UI binary file, or UIB file, is arranged to behave in a similar manner as a stream of machine code where only a portion of the stream needs to be in-memory at a given time. As the entire UI tree representation does not need to be loaded into memory, significant savings in memory usage at runtime can be expected to be realized in most implementations.

Figure 4:
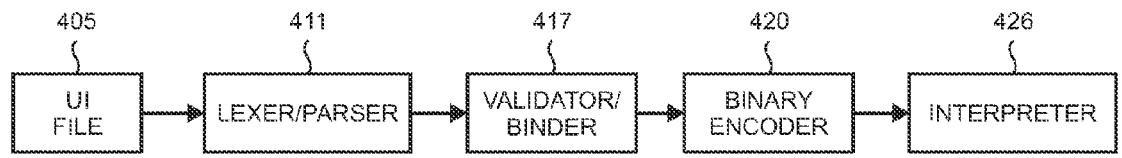
FIG. 4 shows an illustrative process flow by which a UI definition file in markup is encoded into a compact UI binary file that includes a non-tree representation of a UI control tree.

The UIB file is generated by encoding a human-readable definition file that is generally written using a declarative syntax such as that provided by a markup language like XML (eXtensible Markup Language). Scripting may also be embedded in the markup, for example using C# ("C-sharp") code or equivalent language having object-oriented, procedural syntax. This encoding process is shown in FIG. 4. Once encoded, the resulting UIB file can be persisted to a device where it is used to create an in-memory stream of instructions that are executed by an interpreter in the runtime environment.

In FIG. 4, the markup is shown as UI file 405 and is used to describe a UI that a designer wishes to render on the device. The markup would thus include a description of UI controls and their behaviors. The UI file 405 is passed to a lexer/parser 411 that functions to parse the markup and subject it to a lexical analysis and verify that its syntax is correct. A validator/binder 417 is then used to validate that all the elements in the markup are semantically correct so that correct meaning is given to the notation and symbols in the markup and that datatypes expressed are correctly matched. UIs and object classes contained within a markup are exposed using the same schema layer as all other type sources. The markup may further be used to create "Markup Types" that can be exported for import into other markup resources.

Figure 5:
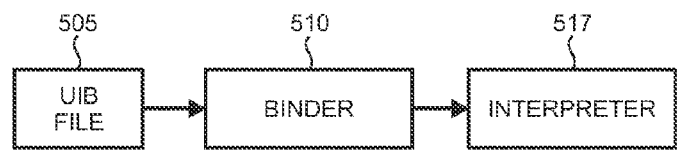
FIG. 5 shows an illustrative process flow by which the UI binary file is interpreted during runtime on a device to render a UI to an end-user.

The binary encoder 420 is utilized to emit the compact binary form of the UI control tree that is expressed by the markup after it goes through the lexical and semantic analyses described above. The binary encoder 420 generates a memory version of the UI expressed by the markup, as validated, that may be executed by a runtime interpreter 426. A UIB file 505 as shown in FIG. 5 is the persisted version of the output stream from the binary encoder 420.

The UIB file 505 operates in a similar manner to a conventional compiled executable file since, by virtue of the markup having been previously subjected to lexical and semantic analyses by the lexer/parser 411 and validator/binder 417, respectively. Accordingly, during runtime of the UI on the device, the UIB file 505 can be fed, after an intermediate data binding process in binder 510, to the interpreter 517 that is supported by either the CLR or JVM shown respectively in FIGS. 1 and 2 without needing to be validated again. As noted above, since the UIB file 505 takes a small memory footprint, it typically can load and execute very quickly in comparison to the traditional loading of a UI control tree and the associated walking of nodes in the tree.

As shown in Table 1 below, the UIB file 505 includes a number of sections:

TABLE 1

| Section | Description | Memory Required? |
| --- | --- | --- |
| Version | Version identifier | Yes |
| Import Tables | Type, Constructor, Property, Method, Event, and Global imports from externals | Yes |
| Export Tables | Type, Constructor, Property, Method, Event, and Global exports to externals | Yes |
| Symbol Table | Set of symbols (names) in use by containing markup | Yes |
| Object and Script | Op-code streams for object build and runtime (scripting) behavior (read-only) | No |

In Table 1, the version section contains versioning information about the markup resource. The import tables contain a list of type, constructor, property, method, and event schemas upon which the markup resource is dependent. The table is index-based and shared. It is used by the object and script section to convert encoded schema indices to actual schema types. The export tables are similar to the import table section, but contain a set of type schemas to which dependent external markup resources bind at runtime. Ordinal values are used to fast-path lookups. The symbol table contains a list of strings used at runtime to reference named entities within the markup. The object and script section accesses this table via an index.

The third column labeled ("Memory Required?") in Table 1 indicates whether memory is required at runtime to hold the entirety of the data structures associated with a particular section in the UIB file. As shown in Table 1, the Object and Script section does not need to be contained in memory during the runtime execution of the binary code.

The object and script section provides the streams of op-codes that are used for building UI objects, and then manipulating those objects during runtime on a device. The high level instructions represented by the op-codes are arranged to be specifically relevant and tailored to meet the requirements of a UI framework. The op-codes are listed below with the resulting stack operations noted in the comments.

```
internal enum OpCode : byte
{
    ConstructObject = 1, // Add
    ConstructObjectParam, // *Remove, Add
    ConstructFromString, // Add
    ConstructFromBinary, // Add
    LookupSymbol, // Add
    WriteSymbol, // Remove
    ClearSymbol, // No stack delta
    PropertyInitialize, // *Remove, Add
    PropertyListAdd, // Remove
    PropertyDictionaryAdd, // Remove
    PropertyChildAdd, // Remove
    PropertyAssign, // Remove, Remove
    PropertyAssignStatic, // Remove
```

-continued

```
    PropertyGet, // Remove, Add
    PropertyGetStatic, // Add
    MethodInvoke, // *Remove, ?Add
    MethodInvokeStatic, // *Remove, ?Add
    VerifyTypeCast, // No stack delta
    ConvertType, // Remove, Add
    Operation, // Add
    PushNull, // Add
    DiscardValue, // Remove
    ReturnValue, // Remove
    ReturnVoid, // No stack delta
    JumpIfFalse, // Remove
    JumpIfDictionaryContains, // Peek (no stack delta)
    Jump, // No stack delta
    ConstructListenerStorage, // Add
    Listen, // No stack delta
    DestructiveListen, // No stack delta
    InitialEvaluate // No stack delta
}
```

Figure 6A:
FIG. 6A shows an illustrative UI control in a first state when rendered by a device during runtime through the execution of op-code streams that are contained in the object and script section of the UI binary file.
Figure 6B:
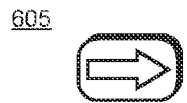
FIG. 6B shows an illustrative UI control in a second state when rendered by a device during runtime through the execution of op-code streams that are contained in the object and script section of the UI binary file.

FIGS. 6A and 6B show a button icon 605 that is used to illustrate the present compact, portable, and efficient UI control tree representation. An example script block for a button object, Clicker, as embedded in a markup file (e.g., the UI file 405) is:

```
<Script>
if (Clicker.Clicking)
{
  Background.Content = ClickingColor;
  return;
}
Background.Content = NormalColor;
</Script>
``` which sets the property Content of the object Background to ClickingColor when the button object receives a mouse click (i.e., the property Clicking of the object Clicker is true). Otherwise, the Content property is set to NormalColor. As shown in FIG. 6A, the ClickingColor in this example is black for the button's background color, which is expressed in RGB (red, green, blue) values as 0, 0, 0. FIG. 6B shows the NormalColor for the button's background is white (255, 255, 255 in RGB). Thus, the scripted UI behavior is that the button 605 turns black when clicked from its normal (i.e., "unclicked") color of white.

The debug output of the binary encoder 420, which includes the op-codes which map to the script block in the example shown above, is:

```
Script 0
{
  0: LookupSymbol (L:v,U:v) (OC=5)           : SYMBOL:uint16=4 | STE='Clicker'
  3: PropertyGet (O:i,G:v,U:v) (OC=13)       : PSI:uint16=16 | PS='Clicking
(PropertyType=Boolean)'
  6: JumpIfFalse (O:v,J) (OC=23)             : OFFSET:25
 11: LookupSymbol (L:v,U:v) (OC=5)           : SYMBOL:uint16=6 | STE='ClickingColor'
 14: LookupSymbol (L:v,U:v) (OC=5)           : SYMBOL:uint16=5 |STE='Background'
 17: PropertyAssign (O:i,O:v,S) (OC=12)      : PSI:uint16=8 | PS='Content
(PropertyType=Color)'
 20: Jump (J) (OC=24)                        : OFFSET:34
 25: LookupSymbol (L:v,U:v) (OC=5)           : SYMBOL:uint16=1 | STE='NormalColor'
 28: LookupSymbol (L:v,U:v) (OC=5)           : SYMBOL:uint16=5 | STE='Background'
 31: PropertyAssign (O:i,O:v,S) (OC=12)      : PSI:uint16=8 | PS='Content
(PropertyType=Color)'
 34: ReturnVoid (R) (OC=20)                  : Return void
}
```

Using the line of output starting with "11" as an example, this first number is byte offset within the binary stream of instructions. The next notation includes the op-code "LookupSymbol" and its associated data. The notation to the right of the colon ":" is additional information that is encoded with the op-code. In this example, the unsigned 16-bit value "6" is utilized as the index within the symbol table (where the symbol is shown in Table 1 and described in the accompanying text). The notation to the right of the pipe "|" is extra information which is derived from the op-code's data. In this example, it is information which results from a lookup from within the symbol table which, as shown, is the string "ClickingColor." This particular exemplary script block uses 34 bytes to represent the runtime operation of the script.

When possible, it is generally preferred for actual object contents to be encoded, rather than their string representation. Such encoding technique enables efficient construction of these objects at runtime. Objects that include binary persistence in their schema definitions would be encoded in this way as well. Such types include: primitives (float, int, bool), and framework structs (Color, Vector3, Size, Point, Inset, Rectangle).

During runtime the op-codes shown above will be executed by the interpreter 517 (FIG. 5) using a small, tight loop, while maintaining a single stack during UI object construction and execution of the script. Accordingly, the interpreter 517 will execute the UI behavior from the example script block upon a mouse click event:

```
Lookup Symbol   : <"Clicker" Origin=Input> 'Root'->'ClickHandler
[push]'
Property Get    : 'ClickHandler [pop]' <Clicking>='True [push]'
```

-continued

```
Jump If False   : 'True [pop]'
Lookup Symbol   : <"ClickingColor" Origin=Properties>
'Root'->'A=255,R=0,G=0,B=0 [push]'
Lookup Symbol   : <"Background" Origin=Content>
'Root'->'ColorFill:2 (Background) [push]'
Property Assign : 'ColorFill:2 (Background) [pop]'
<Content><-'A=255,R=204,G=204,B=204 [pop]'
Jumping         : Offset=34
Return Void     : Void
```

Here, since the boolean property for Clicking is 'True', the result of the "ClickingColor" lookup (RGB of 0, 0, 0 as noted above) is transferred to the property Content for the object Background. FIG. 6A shows the scripted UI behavior is such that the background of the button 605 is colored black when clicked.

For an event of the mouse button release, the interpreter 517 will execute the example script block:

```
Lookup Symbol   : <"Clicker" Origin=Input> 'Root'->'ClickHandler [push]'
Property Get    : 'ClickHandler [pop]' <Clicking>='False [push]'
Jump If False   : 'False [pop]'
Jumping         : Offset=25
Lookup Symbol   : <"NormalColor" Origin=Properties>
'Root'->'A=255,R=255,G=255,B=255 [push]'
Lookup Symbol   : <"Background" Origin=Content>
'Root'->'ColorFill:2 (Background) [push]'
Property Assign : 'ColorFill:2 (Background) [pop]'
<Content><-'A=255,R=255,G=255,B=255 [pop]'
```

Here, since the boolean property for Clicking is 'False, the result of the "ClickingColor" lookup (RGB of 255, 255, 255 as noted above) is transferred to the property Content for the object Background. FIG. 6B shows the scripted UI behavior as implemented when the background of the button 605 is colored black when not being clicked (i.e., mouse button release).

Figure 7:
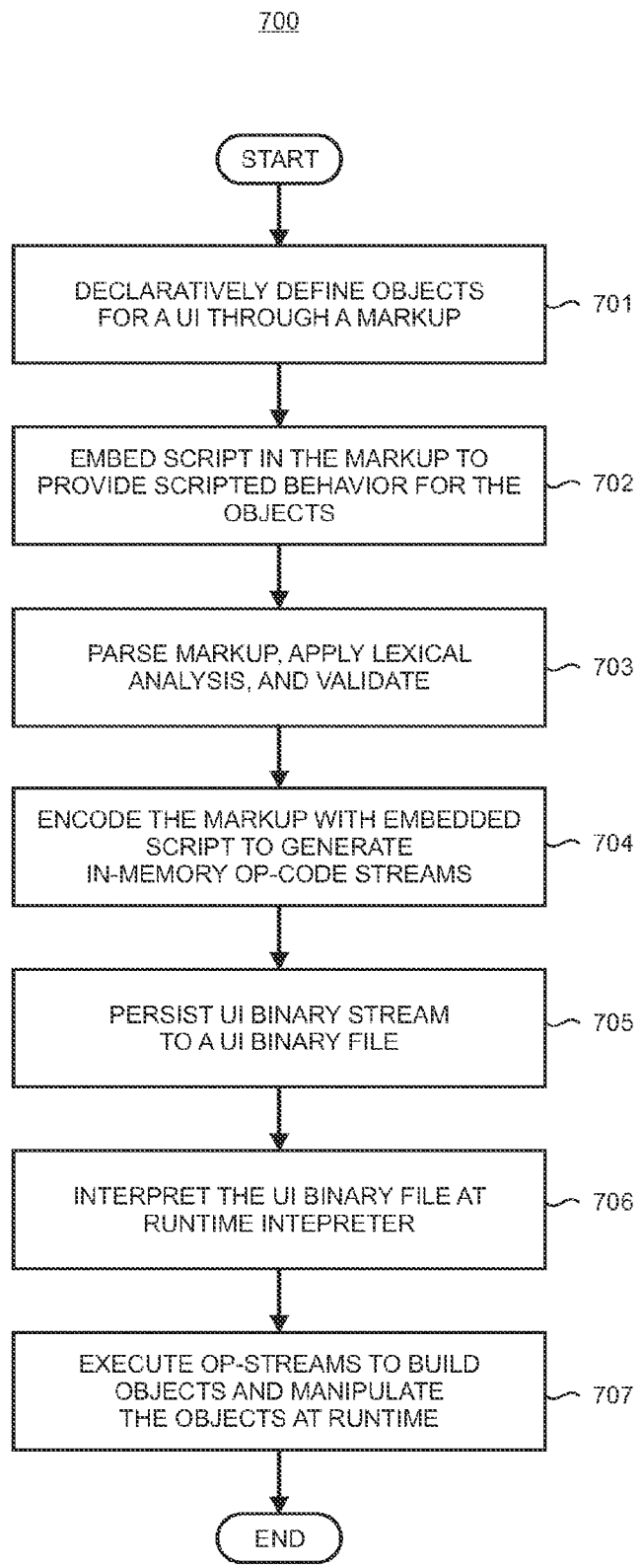
FIG. 7 is a flowchart of an illustrative method in which a UI binary file is generated and interpreted to build and manipulate UI objects.

FIG. 7 shows a flowchart 700 of an illustrative method for generating a UI binary file and interpreting the file to build and manipulate UI objects at runtime which summarizes the principles of the present arrangement. At 701, a human-readable definition file using a declarative syntax, for example an XML markup, is used to define objects used in a UI. At 702, script may be embedded using, for example, C# code or other code that typically uses a procedural syntax.

After undergoing lexical analysis and being validated at 703, the markup (and script if utilized) is encoded to generate the in-memory op-code streams, as indicated at 704. The resultant binary stream can be directly persisted, at 705, into the object and script section of the UI binary file.

At 706, the op-code streams are interpreted during runtime so that UI objects may be constructed and script executed to manipulate the objects when the UI is rendered on a device, as indicated at 707.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium containing instructions which, when executed by one or more processors disposed in an electronic device, perform a method for implementing a user interface (UI), the method comprising the steps of:
   receiving an in-memory op-code stream in an object construction and scripting section of binary code in a file, the in-memory op-code stream not comprising cached bytecode, the binary code being encoded from a declarative markup that includes embedded script, the markup defining a UI including UI control objects; and
   interpreting the op-code stream to construct the UI control objects and execute the script at runtime to render the UI in a runtime environment on a device, the interpreting being performed while maintaining a single stack through operation of the object construction and execution of the script.

2. The computer-readable storage medium of claim 1 in which the runtime environment is one of Common Language Runtime (CLR) or Java Virtual Machine (JVM).

3. The computer-readable storage medium of claim 1 in which the object and scripting section is not loaded into memory during runtime.

4. The computer-readable storage medium of claim 3 in which the interpreting does not include any validating between the construction of the UI control objects and the rendering of the UI.

5. A method for generating a binary instruction stream for creating and manipulating a user interface (UI) for execution on a device at runtime, the method comprising the steps of:
   declaratively constructing objects for a UI through a markup;
   providing scripted behavior for the objects using script that is embedded in the markup; and
   encoding the markup and script to generate an in-memory binary instruction stream containing op-codes that are respectively mapped to the constructed objects and scripted behavior, the in-memory binary instruction stream containing op-codes not comprising cached bytecode, the in-memory binary instruction stream being interpreted while maintaining a single stack through operation of the object construction and execution of the script at runtime.

6. The method of claim 5 in which the binary instruction stream is further configured to be portable across different operating system architectures.

7. The method of claim 6 including a further step of encoding an index to a symbol table with the op-code, the symbol table containing a list of strings used at runtime to reference named entities within the markup.

8. The method of claim 7 including a further step of subjecting the markup to a lexical analysis for checking syntax of the markup.

9. The method of claim 8 including a further step of passing the markup through a validator to validate data types within the markup.

10. A method for generating a user interface (UI) binary file for representing a UI control tree in a compact form, the method comprising the steps of:
    receiving a UI definition file in human-readable form, the UI definition file expressing a set of UI control behaviors using a declarative syntax for building a plurality of UI objects and embedded script for manipulating built objects;
    encoding the UI definition file by emitting an op-code as an in-memory binary instruction stream, the op-codes being selected for implementing the built objects and scripted control behaviors at runtime and the op-codes not comprising cached bytecode; and generating the UI binary file by persisting the in-memory binary instruction stream, the in-memory binary instruction stream being interpreted while maintaining a single stack through operation of the object building and execution of the scripted control behaviors at runtime.

11. The method of claim 10 in which the declarative syntax uses a markup resource expressed in eXtensible Markup Language (XML).

12. The method of claim 11 in which the embedded script is expressed using an object-oriented programming language.

13. The method of claim 12 including a further step of including an import table in the UI binary file, the import table listing data upon which the markup resource depends, the data being at least one of type, constructor, property, method or event schema.

14. The method of claim 13 in which the import table uses an index and is configured to be sharable.

15. The method of claim 14 including a further step of including an export table in the UI binary file, the export table containing a plurality of type schemas to which one or more dependent external markup resources are bound at runtime.

16. The method of claim 15 including a further step of including a symbol table in the UI binary file, the symbol table comprising a plurality of strings which reference named entities within the UI definition file.

17. The method of claim 16 in which the symbol table is accessed via the index.

18. The method of claim 17 in which the UI binary file is portable across devices.

19. The method of claim 18 in which the devices include ones of personal computers (PCs) and portable devices.

* * * * *